United States Patent [19]

Blackmore et al.

[11] 4,381,827
[45] May 3, 1983

[54] STEERING MECHANISM FOR ARTICULATED VEHICLES

[75] Inventors: Donald F. Blackmore, Wadsworth; Rudolph Halmosi, Hudson, both of Ohio

[73] Assignee: General Motors Corporation, Detroit, Mich.

[21] Appl. No.: 195,191

[22] Filed: Oct. 8, 1980

Related U.S. Application Data

[63] Continuation-in-part of Ser. No. 14,339, Feb. 23, 1979, abandoned.

[51] Int. Cl.³ ............................................. B62D 5/10
[52] U.S. Cl. .................................... 180/139; 180/235
[58] Field of Search ............... 180/139, 138, 136, 235, 180/263, 134

[56] References Cited

U.S. PATENT DOCUMENTS

| | | | |
|---|---|---|---|
| 2,638,998 | 5/1953 | Rockwell | 180/139 |
| 3,032,135 | 5/1962 | McAdams | 180/139 |
| 3,097,719 | 7/1963 | Rood | 180/136 |
| 3,292,724 | 12/1966 | Fryer | 180/139 |
| 3,314,496 | 4/1967 | Thassy | 180/139 |
| 3,363,711 | 1/1968 | Knell | 180/139 |

*Primary Examiner*—Joseph F. Peters, Jr.
*Assistant Examiner*—Ross Weaver
*Attorney, Agent, or Firm*—Edward J. Biskup

[57] ABSTRACT

A steering mechanism for an articulated vehicle having first and second frame sections with one of the frame sections having a pair of idler links pivotally mounted thereto at laterally spaced points, and the other frame section having a pair of drive links pivotally connected thereto at laterally spaced points. The free ends of adjacent drive and idler links on each side of the vehicle are pivotally interconnected and the relative lengths of the drive and idler links as well as the location of the pivot connections joining the drive and idler links to the first and second frame sections and to each other is such that the return steering torque at 90° steer angle is at least equal to the steering torque available at 0° steer angle.

3 Claims, 6 Drawing Figures

STEERING MECHANISM FOR ARTICULATED VEHICLES

This application is a continuation-in-part of application Ser. No. 14,339, filed Feb. 23, 1979 now abandoned.

This invention concerns a steering mechanism for vehicles having interconnecting frame sections and more particularly relates to a steering mechanism of the four-bar linkage type which can be employed with articulated vehicles, such as a self-propelled scraper vehicle comprising a tractor-drawn scraper bowl in which the tractor and scraper bowl are interconnected about a vertical steer axis.

U.S. Pat. No. 3,292,724 which issued on Dec. 20, 1966 in the name of Edward R. Fryer and is assigned to the Assignee of this invention, discloses a steering and coupling mechanism of the four-bar linkage type for an articulated vehicle which has relatively movable first and second frame sections that are interconnected about a vertical steer axis and has incorporated therewith power-operated means that act through a pair of V-shaped drive links and a pair of V-shaped idler links for moving one frame section relative to the other. The drive links and the idler links are identical in configuration and are so arranged that when the frame sections are at 0° steer angle so as to be aligned for straight-ahead movement, the pivot connections between the drive links and the idler links and between the frame sections and the drive links and the idler links are located along the longitudinal center axis of the vehicle and along a line that is normal to the longitudinal center axis and passes through the vertical steer axis.

The present invention is directed to a steering mechanism of the four-bar linkage type that is similar to the above-described mechanism, but is an improvement thereover in that the present invention employs link members that have the lengths thereof and the pivot connections associated therewith so arranged that a flatter torque curve is realized during turning maneuvers. In this regard, it has been found that a steering mechanism made according to the present invention not only provides a steering torque at 90° tractor steer angle that is substantially equal to the steering torque at 0° tractor steer angle, but also provides a return steering torque at 90° tractor steer angle that is greater than the starting steering torque at 0° tractor steer angle. As a result, more efficient steering is realized with increased steering torque being available when the tractor is returning to a straight-ahead aligned position from a turned position.

In the preferred form, the steering mechanism made according to the present invention is incorporated with an articulated vehicle having a first frame section and a second frame section pivotally interconnected for relative steering articulation about a vertical steer axis and includes a pair of identical drive links and a pair of identical idler links. One end of each of the idler links is connected to one of the two frame sections of the articulated vehicle for pivotal movement about laterally spaced first and second pivot axes located on opposite sides of the longitudinal center axis of the vehicle when the two frame sections are at 0° steer angle in straight-ahead alignment. Similarly, one end of each of the drive links is connected to the other frame section of the vehicle for pivotal movement about laterally spaced third and fourth pivot axes located on opposite sides of the longitudinal center axis of the vehicle. The free ends of the drive links and the free ends of the idler links are interconnected for relative pivotal movement about fifth and sixth pivot axes. A pair of fluid pressure-operated steering jacks are located on opposite sides of the longitudinal center axis of the vehicle, with the rod ends of the respective steering jacks being pivotally connected to the drive and idler links at the fifth and sixth pivot axes, and the cylinder ends of the steering jacks being pivotally connected to one of the frame sections of the vehicle. These pivot axes are so arranged that the distance between the first and second pivot axes is substantially equal to the distance between the first and fifth pivot axes, or between the second and sixth pivot axes, while the distance between the third and fourth pivot axes is substantially equal to one-half the distance between the third and fourth pivot axes, or between the fourth and sixth pivot axes, and whereby a straight line passing through the vertical steer axis and the fifth pivot axis or the sixth pivot axis is substantially perpendicular to the longitudinal center axis of the vehicle when the two frame sections are in straight-ahead alignment.

A more complete understanding of the invention can be derived from the following detailed description when taken in conjunction with the accompanying drawings, in which.

Figure 1:
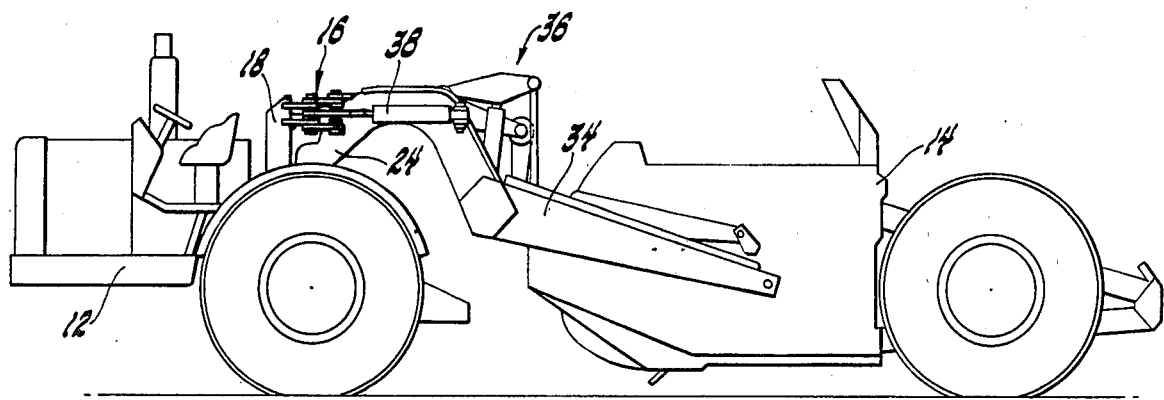
FIG. 1 is a side elevational view showing an articulated scraper vehicle including a tractor and a scraper bowl employing a steering mechanism made in accordance with the present invention.
Figure 2:
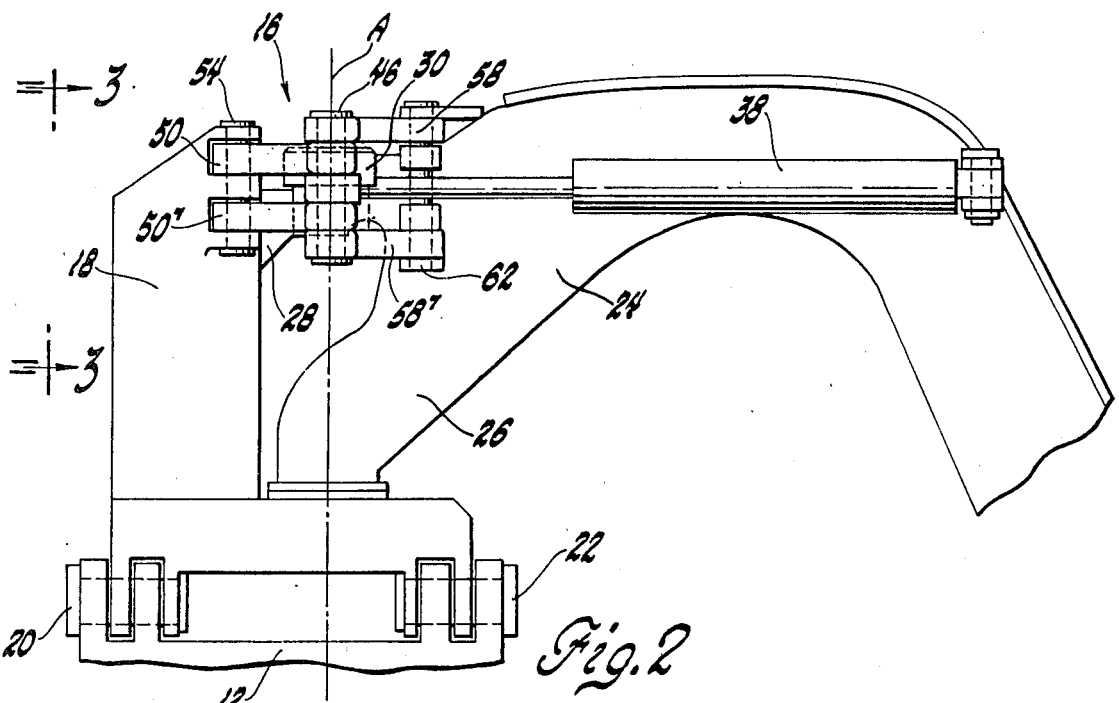
FIG. 2 is an enlarged side elevational view showing in detail the steering mechanism employed with the articulated scraper vehicle of FIG. 1.
Figure 3:
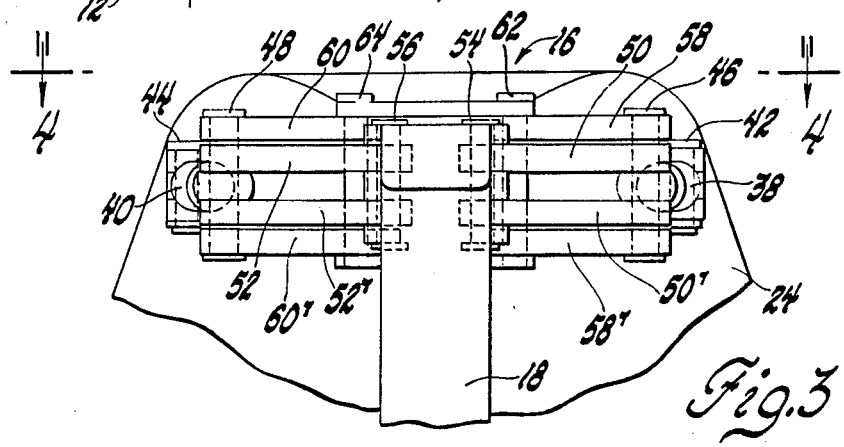
FIG. 3 is a front view of the steering mechanism taken on line 3—3 of FIG. 2.
Figure 4:
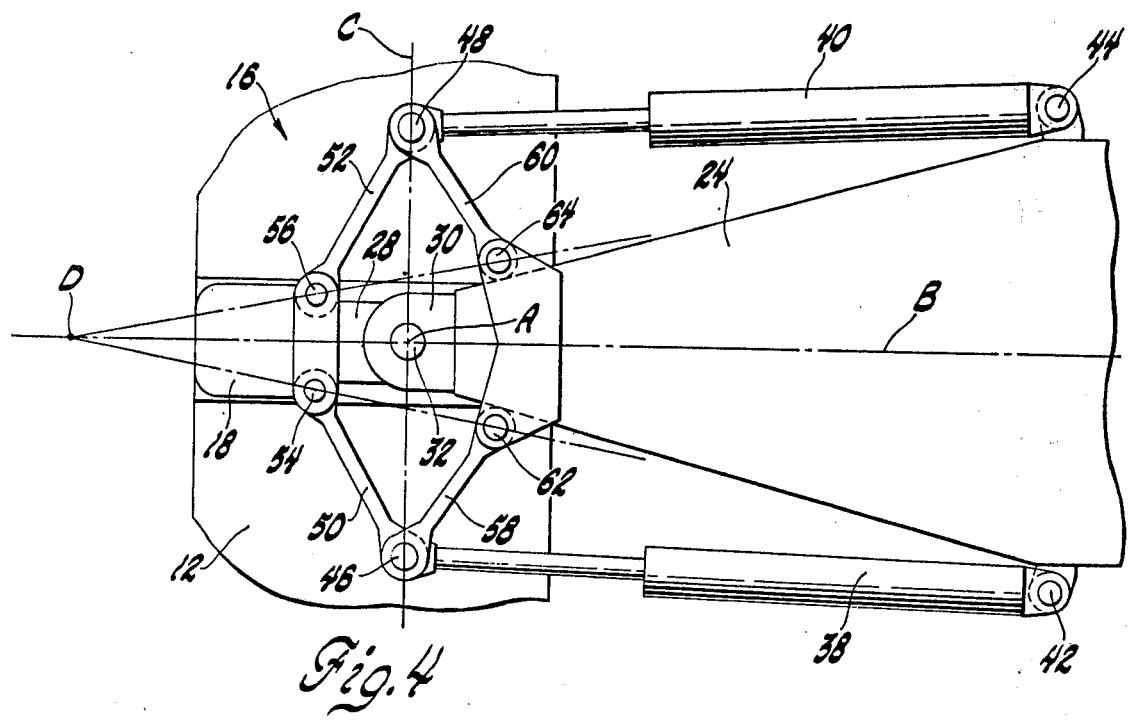
FIG. 4 is a plan view of the steering mechanism taken on line 4—4 of FIG. 3 and shows the tractor and scraper bowl of the articulated scraper vehicle in straight-ahead alignment.
Figure 5:
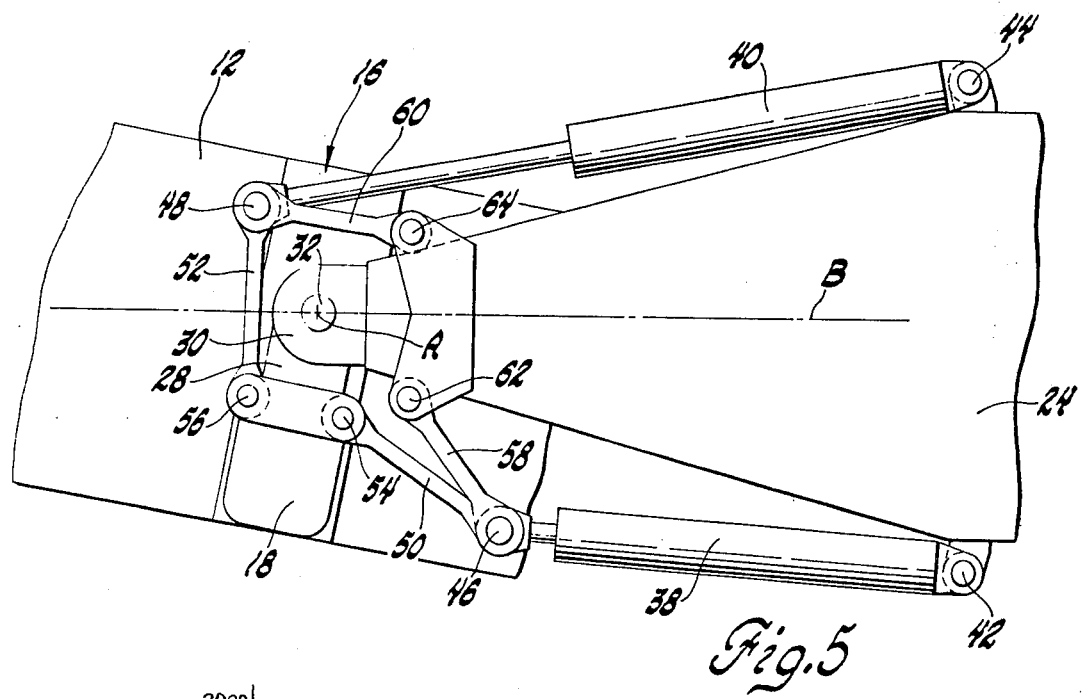
FIG. 5 is a view similar to FIG. 4, showing the relative locations of the various components of the steering mechanism when the tractor is in a substantially full 90° turn relative to the scraper bowl.

Referring now to FIG. 1 of the drawings, a scraper vehicle is shown comprising a two-wheeled overhung tractor 12 which is connected to a trailing scraper bowl 14 by a steering mechanism 16 of the four-bar linkage type made according to the present invention, and shown in detail in FIGS. 2 through 5. The steering mechanism 16 is combined with a vertically upstanding frame member 18, the lower portion of which is pivotally connected by pivot connections 20 and 22 to the tractor 12 for oscillatory movement about a horizontal axis. A gooseneck or draw-bar 24 has a pivot housing 26 formed therewith that is journalled on a king pin (not shown) fixed with the lower portion of the frame member 18 for rotation about a vertical steer axis "A" between the tractor 12 and the scraper bowl 14. Similarly, as seen in FIGS. 2 and 4, the upper portions of the frame member 18 and the draw-bar 24 are rigidly formed with pivot housings 28 and 30 which are interconnected by a pin 32, the longitudinal center axis of which is coincidental with the vertical steer axis "A".

As is usual with scraper vehicles of the type shown in FIG. 1, the draw-bar 24 is rigidly connected with a pair of transversely spaced pull-arms, only one of which is shown and indicated by the numeral 34, that extend rearwardly for pivotal connection with the scraper bowl 14. In addition, the scraper vehicle includes the usual operating mechanism, indicated generally by the numeral 36, for purposes of raising and lowering the scraper bowl 14 and the usual apron associated therewith.

As best seen in FIGS. 3, the steering mechanism 16 includes a pair of double-acting hydraulic steering jacks 38 and 40, each of which incorporates the usual relatively reciprocable piston rod and cylinder member. In this instance, the cylinder members of the respective hydraulic steering jacks 38 and 40 are pivotally connected by vertically extending pins 42 and 44 to brackets rigidly secured to opposite sides of the draw-bar 24, while the piston rods of the steering jacks 38 and 40 are pivotally connected by vertically extending pins 46 and 48 to identical drive link members 50 and 52. The drive link members 50 and 52, in turn, are pivotally connected by vertically extending pins 54 and 56 to the frame member 18 forwardly of the pivot housings 28 and 30. A pair of identical idler links 58 and 60 are pivotally connected to the drive link members 50 and 52 by the pins 46 and 48 and extend rearwardly for pivotal connection to the draw-bar 24 by vertically extending pins 62 and 64.

As seen in FIGS. 2 and 3, the drive link members 50 and 52 have duplicate link members positioned below and pivotally connected with pins 46 and 48, 54 and 56. The duplicate drive link members are identified by corresponding but primed reference numerals 50' and 52'. Similarly, the idler link members 58 and 60 have duplicate idler link members positioned below thereof and pivotally connected to the pins 46, 48, 62, and 64. As in the case of the drive link members, the duplicate idler link members are identified by corresponding but primed reference numerals 58' and 60'.

As is conventional is steering mechanisms of the above-described type, the steering jacks 38 and 40 are connected to a fluid pressure system (not shown) which selectively provides pressurized fluid to the opposite ends of the steering jacks 38 and 40. Thus, when pressurized fluid is directed to the cylinder end of the steering jack 40 and the piston rod end of the steering jack 38, the tractor 12 is rotated through the steering mechanism 16 counterclockwise about the steer axis "A" so that the drive links 50 and 52 and idler links 58 and 60 assume the relative positions shown in FIG. 5. As should be apparent, directing pressurized fluid to the opposite ends of the steering jacks 38 and 40 will cause the tractor 12 to be rotated clockwise about the steer axis "A" relative to the scraper bowl 14.

It will be noted that as seen in FIG. 4 and when the tractor 12 and scraper bowl 14 are in longitudinal alignment so that the scraper vehicle is moving straight ahead, the centers of the pivot connections defined by the pins 54 and 56 are equally spaced from the longitudinal center axis "B" of the scraper vehicle. Also, the centers of the pivot connections defined by the pins 62 and 64 are equally spaced from the longitudinal center axis "B". Moreover, during such time the centers of the pivot connections defined by pins 46 and 48 and the steer axis "A" are located along an axis "C" which is perpendicular to the scraper vehicle's longitudinal center axis "B". It will also be noted that the distance between the centers of the pins 62 and 64 and the distance between the centers of the pins 46 and 62, or between the centers of pins 48 and 64 is substantially the same. The distance between the centers of pins 54 and 56, however, is substantially one-half the distance between the centers of pins 48 and 56, or between the centers of pins 46 and 54. In addition, when the scraper vehicle is in the straight-ahead position as seen in FIG. 3, a straight line passing through the centers of the pivot connections defined by pivot pins 56 and 64 and a straight line passing through the centers of the pivot connections defined by pivot pins 54 and 62 will intersect at a point "D" which is located forwardly of the vertical steer axis "A" and on the longitudinal center axis "B".

Figure 6:
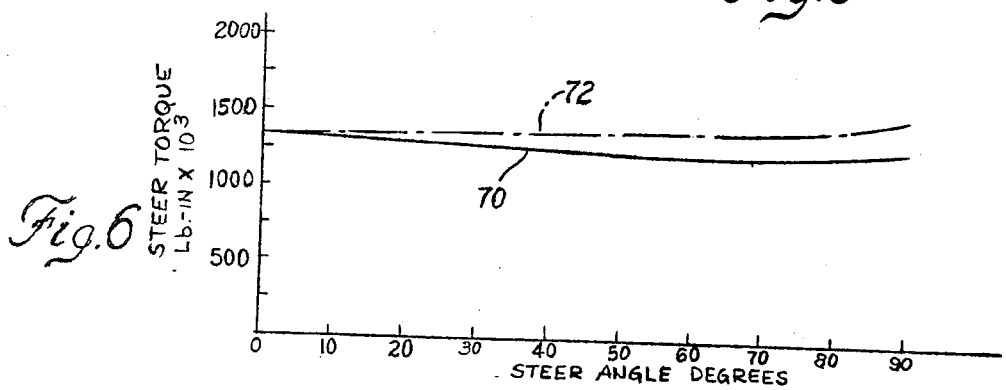
FIG. 6 is a graph showing the steering torque curves provided by the steering mechanism shown in FIGS. 1–5.

A computer study of a steering mechanism having the general arrangement of pivot connections and link members as set forth above has provided the steering torque curves 70 and 72 seen in the graph of FIG. 6. In this regard, it will be noted that steering torque curve 70 indicates the amount of torque provided by the steering mechanism 16 as the tractor 12 is turned from a straight-ahead alignment position (0° steer angle) to a fully-turned position (90° steer angle), while steering torque curve 72 indicates the amount of return torque provided by the steering mechanism 16 as the tractor 12 is returned from the fully-turned position (90° steer angle) to the straight-ahead alignment position.

As seen in FIG. 6, when the tractor 12 is returned from the 0° steer angle position to the 90° steer angle position, the steering torque remains substantially constant—starting with a value of approximately 1,330,000 lb/in., and ending with a value of approximately 1,300,000 lb/in. On the other hand, as the tractor 12 is returned from the 90° steer angle position to the 0° steer angle position, the return steering torque available at 90° steer angle is approximately 1,500,000 lb/in. Accordingly, increased steering torque is available for returning the tractor 12 to the straight-ahead alignment position. The increased steering torque at 90° steer angle could be particularly useful in a situation where the tractor 12 has to be returned to straight-ahead alignment from a down-hill position.

The steering mechanism that provided the steering torque curves 70 and 72 shown in FIG. 6 utilized steering jacks 38 and 40, each having a 6-inch diameter base cylinder, a 2.50-inch diameter piston rod, and was part of a fluid pressure system operating at approximately 2000 psi. In addition and with reference to FIG. 4, with the scraper vehicle in straight-ahead alignment (0° steer angle), the distance between the centers of pins 44 and 48 and the distance between the centers of pins 42 and 46 was 81.75 inches, respectively. Also, the distance between the centers of pins 54 and 56 and the distance between the centers of pins 62 and 64 was 8.25 inches and 23.00 inches, respectively. Furthermore, the distance between the vertical steer axis "A" and a line perpendicular to the longitudinal center axis "B" and passing through the centers of pins 62 and 64 was 12.50 inches, while the distance between the vertical steer axis "A" and a line perpendicular to the longitudinal center axis "B" and passing through the centers of pins 54 and 56 was 13.20 inches. Still furthermore, the distance between the centers of pins 46 and 48 was 55.00 inches and the distance—measured along a line normal to the longitudinal center axis "B", between the centers of pin 44 and the longitudinal center axis "B" and the pin 42 and the longitudinal center axis "B", each was 30.25 inches.

Various changes and modifications can be made in this construction without departing from the spirit of the invention. Such changes and modifications are contemplated by the inventors, and they do not wish to be limited except by the scope of the appended claims.

The embodiments of the invention in which an exclusive property or privilege is claimed are defined as follows:

1. A steering mechanism for an articulated vehicle comprising first and second frame sections, means pivotally interconnecting said frame sections about a steering axis for relative steering articulation therebetween to either side of straight-ahead steering alignment of said frame sections; a pair of drive links and a pair of idler links; means connecting one end of one of said idler links and one end of the other of said idler links to said first frame section for pivotal movement about first and second pivot axes located on opposite sides of the longitudinal center axis of said vehicle when said frame sections are in straight-ahead steering alignment; means connecting one end of one of said drive links and one end of the other of said drive links to said second frame section for pivotal movement about third and fourth pivot axes located on opposite sides of said longitudinal center axis; means connecting the other ends of said idler links and the other ends of said drive links for relative pivotal movement about fifth and sixth pivot axes; a pair of fluid pressure-operated steering jacks located on opposite sides of said longitudinal center axis with one end of said steering jacks pivotally connected to said drive and idler links at said fifth and sixth pivot axes and the other end of said steering jacks pivotally connected to said first frame section, said pivot axes being so located that the distance between said first and second pivot axes is greater than the distance between said third and fourth pivot axes and a straight line passing through said steering axis and said fifth pivot axis or said sixth pivot axis is substantially perpendicular to said longitudinal center axis when said frame sections are in straight-ahead steering alignment whereby the return steering torque at 90° steer angle is at least equal to the steering torque at 0° steer angle.

2. A steering mechanism for an articulated scraper vehicle comprising a tractor and a trailing bowl, means pivotally interconnecting said tractor and trailing bowl about a vertical steering axis for relative steering articulation therebetween to either side of straight-ahead steering alignment of said tractor and trailing bowl; a pair of identical straight drive links and a pair of identical straight idler links; means connecting one end of one of said idler links and one end of the other of said idler links to said trailing bowl for pivotal movement about laterally spaced first and second pivot axes located on opposite sides of the longitudinal center axis of the vehicle when said tractor and trailing bowl are in straight-ahead steering alignment; means connecting one end of one of said drive links and one end of the other of said drive links to said tractor for pivotal movement about laterally spaced third and fourth pivot axes located on opposite sides of said longitudinal center axis; means connecting the other ends of said idler links and the other ends of said drive links for relative pivotal movement about fifth and sixth pivot axes; a pair of double-acting fluid pressure-operated steering jacks located on opposite sides of said longitudinal center axis with the rod ends of said steering jacks pivotally connected to said drive and idler links at said fifth and sixth pivot axes and the cylinder ends of said steering jacks pivotally connected to said trailing bowl, all of said pivot axes being so located that the distance between said first and second pivot axes is substantially equal to the distance between said first and fifth pivot axes and said second and sixth pivot axes while the distance between said third and fourth pivot axes is substantially equal to one-half the distance between said third and fifth pivot axes and said fourth and sixth pivot axes whereby the return steering torque at 90° steer angle is at least equal to the steering torque at 0° steer angle.

3. A steering mechanism for an articulated vehicle comprising first and second frame sections, means pivotally interconnecting said first and second frame sections about a vertical steering axis for relative steering articulation therebetween to either side of straight-ahead steering alignment of said first and second frame sections; a pair of drive links and a pair of idler links; means connecting one end of one of said idler links and one end of the other of said idler links to said first frame section for pivotal movement about laterally spaced first and second pivot axes located on opposite sides of the longitudinal center axis of the vehicle when said first and second frame sections are in straight-ahead steering alignment; means connecting one end of one of said drive links and one end of the other of said drive links to said second frame section for pivotal movement about laterally spaced third and fourth pivot axes located on opposite sides of said longitudinal center axis; means connecting the free ends of said idler links and the free ends of said drive links for relative pivotal movement about fifth and sixth pivot axes; a pair of fluid pressure-operated steering jacks located on opposite sides of said longitudinal center axis with one end of said steering jacks pivotally connected to said drive and idler links at said fifth and sixth pivot axes and the other end of said jacks pivotally connected to said first frame section, all of said pivot axes being so located that a straight line passing through said first and third pivot axes and a straight line passing through said second and fourth pivot axes intersect at a single point located on said longitudinal center axis of the vehicle, and the distance between said first and second pivot axes is substantially equal to the distance between said first and fifth pivot axes or the distance between said second and sixth pivot axes, while the distance between said third and fourth pivot axes is substantially equal to one-half the distance between said third and fifth pivot axes or the distance between said fourth and sixth pivot axes whereby the return steering torque at 90° steer angle is at least equal to the steering torque at 0° steer angle.

* * * * *